July 17, 1956 W. A. BAUM 2,755,428
REGULATED D.C. POWER SUPPLY
Filed Sept. 20, 1954
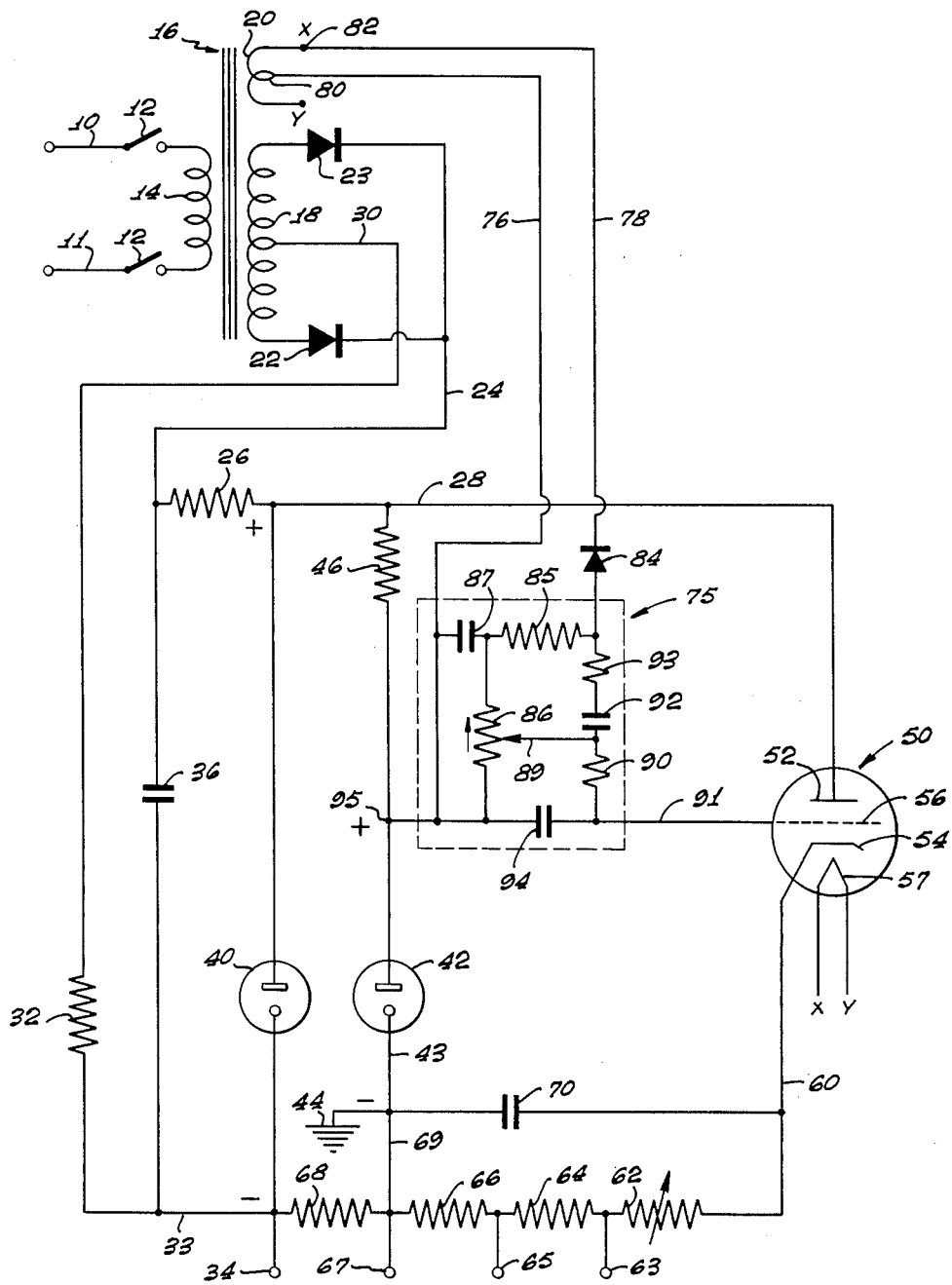
INVENTOR.
WILLIAM A. BAUM
BY
ATTORNEY.

United States Patent Office 2,755,428
Patented July 17, 1956

---

2,755,428

REGULATED D. C. POWER SUPPLY

William A. Baum, Pasadena, Calif., assignor to Photo Research Corporation, Burbank, Calif., a corporation of California Application September 20, 1954, Serial No. 457,263

10 Claims. (Cl. 321—18)

The present invention relates generally to electronic circuitry and particularly describes a circuit for producing a D. C. power supply from an input A. C. voltage, and is advantageous where the output D. C. voltage must remain virtually constant despite fluctuations in the input A. C. voltage.

A conventional A. C. power source is maintained at some nominal value—illustratively, 115 volts—but, as is well known, the voltage in fact fluctuates from the nominal value incident to many variables such as additional load being imposed upon the line and other factors. For many applications, it is desirable to provide a D. C. power supply whose power is derived through rectifying means from an input A. C. power source and whose output D. C. voltage is unaffected by A. C. line voltage fluctuations. The variations which must be overcome in order to provide a constant voltage D. C. output may be of very short duration, in the nature of a few cycles or less, or may be of longer duration. The present invention meets this need.

Generally speaking the preferred form of the invention includes transformer and rectifier means, an output grid-controlled thermionic tube, such as a triode, fed by the rectified power and connected as a cathode follower, a voltage regulator tube for roughly regulating the rectified voltage impressed across the tube, and means for developing a control voltage for the grid of the triode. The control voltage is made up of a virtually constant voltage component derived from a suitable source such as a voltage reference tube, combined in polarity opposition with a compensating voltage component arranged to counteract changes in D. C. voltage of the power output which would otherwise result from fluctuations in voltage of the A. C. power source. A particular feature is the provision of time delay means in the portion of the circuit developing the compensating voltage component in order that such component may compensate for the effects of cathode temperature change resulting from fluctuations in voltage feeding the heater of the triode.

As a result, the circuit of the present invention provides an output D. C. voltage which remains constant despite fluctuations in voltage of the A. C. power source, whether such fluctuations be of a relatively short duration, such as a few cycles, or of long duration. Throughout the description and definition of the invention, the word "regulated" as applied to the output D. C. voltage will be understood to refer to the dependence of that voltage upon fluctuations in input A. C. voltage, rather than upon the D. C. power output. It may be noted that in the present circuit the output D. C. voltage decreases slightly with increase in load, but since this decrease is linear with load, it is of relatively minor importance for most applications and where the load is constant, it is of course irrelevant. The present circuit is especially useful as a power supply for a photometer or similar equipment where the load is essentially constant.

An object of the present invention is therefore to provide a novel circuit for a rectified D. C. power supply having a virtually constant output D. C. voltage despite fluctuations in A. C. voltage input thereto.

Another object of the invention is to disclose a circuit including a grid-controlled thermionic output tube and means for controlling the potential of the control grid whereby to maintain constant output D. C. voltage in the cathode circuit of the tube regardless of fluctuations in plate voltage and filament voltage.

Another object of the invention is to provide a rectified D. C. power supply including a thermionic tube having a control grid wherein the potential impressed upon the grid is controlled by a circuit having adjustable time constant characteristics.

A further object of the invention is to provide in a circuit of the above character a heated cathode tube and means for compensating for changes of temperature of the cathode caused by fluctuations of voltage input to the heater.

Still another object is to disclose, in a constant voltage D. C. power supply, a time constant circuit governing the control grid voltage wherein a single resistive element develops a transient voltage applied to the control grid, the resistive element being connected across one capacitor and in series with a second capacitor.

These and other objects and purposes of the invention will become clear from a study of the following description of a preferred embodiment thereof taken in connection with the accompanying drawing illustrating a preferred circuit by which the invention may be practiced.

Referring in detail to the drawing, input leads 10 and 11 are adapted to be connected to a source of A. C. power which may have a nominal voltage, for example, of 115 volts. Power introduced into these leads is fed through switch 12 to the primary winding 14 of a transformer indicated generally at 16. This transformer desirably includes two secondary windings, a high voltage secondary winding 18 and a low voltage secondary winding 20. The output of the secondary winding 18 is fed through rectifiers 22 and 23 to a conductor 24 and thence through resistor 26 to the positive line 28. Secondary winding 18 includes a centertap 30 connected through resistor 32 and negative line 33 to one of the output terminals 34. A filter capacitor 36 is connected across leads 24 and 33.

Means are provided for roughly regulating the voltage between lines 28 and 33. In the present illustration such means include a voltage regulator tube 40 which may for example, be an OA2 tube. This regulator tube, in accordance with well-known principle, maintains a generally constant voltage between lines 28 and 33 despite fluctuations in the voltage of the input A. C. source but some residual dependence upon input A. C. voltage remains. Means are also provided for furnishing a stable source of D. C. potential for purposes later to be described, this last-named means including voltage reference tube 42, which may, for example, be a 5651 tube, together with resistor 46. Reference tube 42 and resistor 46 are connected together from line 28 to ground at 44 through conductor 43, and the voltage across reference tube 42 remains quite stable regardless of fluctuations in input A. C. voltage.

A grid-controlled thermionic tube indicated generally at 50, preferably a conventional triode, includes anode or plate 52, cathode 54 and control grid 56. The cathode 54 is heated by heater filament 58 whose terminals X and Y are adapted to be connected in conventional manner to the output of the low voltage secondary winding 20 of transformer 16, these connections being omitted in the circuit diagram in the interest of clarity. The anode or plate 52 of the tube 50 is connected to positive line 28, and the cathode 54 is connected through line 60 and adjustable resistor 62 to an output voltage divider made up of resistors 64, 66 and 68, the negative end of the last named resistor being connected to output terminal 34. Thus thermionic tube 50 is connected as a cathode follower. Additional output terminals are provided including output terminal 63 at the positive end of resistor 64, output terminal 65 between resistors 64 and 66 and output terminal 67 between resistors 66 and 68, this last-named output terminal being grounded at 44 through conductor 69. The output resistors 64 and 66, as well as the adjustable resistor 62, are shunted by capacitor 70 to minimize line frequency ripple in the output D. C. voltages.

The control potential or voltage impressed upon grid 56 of triode 50 is made up of a stable voltage component furnished by reference tube 42 and a compensating voltage component which counteracts variations otherwise occurring in the output voltages appearing at terminals 63 and 65. The compensating voltage component is developed by the circuitry within the rectangular area indicated generally at 75.

A small non-regulated D. C. voltage is derived from the input A. C. source by means of a circuit including lines 76 and 78 connected respectively across the center-tap 80 and one terminal 82 of the low voltage secondary winding 20 of transformer 16. The circuit also includes rectifier 84 and a path for direct current including resistor 85 and potentiometer 86. Capacitor 87 shunts the potentiometer and is in series with resistor 85 across the input. A movable arm 89 is adapted to slidingly contact potentiometer 86. The arm 89 is connected through resistor 90 and lead 91 to control grid 56 of triode 50, and through capacitor 92 and resistor 93 to the input. A small capacitor 94 may be connected between regulator tube 42 and control grid 56, but its effect is slight and it may be dispensed with entirely without unduly affecting the circuit operation.

It will be seen that under steady-state conditions a circuit is established for direct current flow from center-tap 80 of secondary winding 20, through line 76, potentiometer 86, resistor 85, rectifier 84 and line 78 to terminal 82 of the secondary winding 20. This current flow is upwardly through potentiometer 86 as seen in the drawing, as indicated by the arrow adjacent the potentiometer. The voltage impressed upon control grid 56 is the resultant of the voltage of point 95, at the positive side of reference tube 42, and the voltages developed in the lower portion of potentiometer 86 and in resistor 90. It may be noted that, since virtually no grid current flows in conductor 91, and since capacitor 94, when used, is of very small value, the voltage component developed across resistor 90 is of relatively minor importance. Thus the principal effect upon the voltage of control grid 56 results from the voltage drop across the lower portion of potentiometer 86, below contact arm 89.

Because current flow is upwardly in potentiometer 86, the voltage drop so produced makes the contact arm 89 more negative than point 95. As an illustrative example, the voltage at point 95 may be plus 83 volts. If there is a one volt drop across the lower portion of potentiometer 86, then the voltage on control grid 56 is 82 volts. Otherwise stated, the voltage drop in the lower portion of potentiometer 86 is combined in polarity opposition with the stable voltage produced by reference tube 42 in order to produce the resultant voltage impressed on control grid 56.

Neglecting transient conditions for the moment, it will be seen that an increase in A. C. input voltage at the transformer 16 creates two effects, both of which tend to increase the D. C. output voltage of the circuit, and also a third effect which tends to decrease that output voltage. Thus a higher rectified voltage between lines 24 and 30 produces a higher filtered voltage across capacitor 36 and at least a slightly higher regulated voltage across regulated tube 40. This regulated voltage, applied across thermionic tube 50 and the load resistors 64, 66 and 68, tends to increase the D. C. output voltage.

Similarly, the higher voltage of secondary winding 20 applied to the heater filament 57 of tube 50 raises the temperature and consequently the emission of cathode 54, thus again increasing output D. C. voltage by reason of increased current flow through the tube.

Counteracting the above two effects, the direct current path between lines 76 and 78 includes potentiometer 86 and resistor 85, and it will be recalled that current flow is upwardly in the potentiometer as indicated by the adjacent arrow. Since the voltage impressed on control grid 56 is the resultant of the virtually constant positive voltage at point 95 and the voltage across the lower portion of potentiometer 86, and since these two voltages are combined in polarity opposition, the control grid 56 is driven more negative by an increase of current flow in potentiometer 86 resulting from an increase in input A. C. voltage. The more negative grid then decreases the output D. C. voltage by decreasing the current flow through tube 50 in familiar manner. Thus, by proper adjustment of contact arm 89, a negative voltage component is combined with the stable voltage component at point 95 to produce a control voltage on grid 56 sufficient to counteract the tendencies first discussed, that is, those of the plate voltage and the filament voltage. Accordingly, a fluctuation of input A. C. voltage causes a change of grid voltage opposite in sense to that of the plate and filament voltage changes caused by the input fluctuation. Obviously each of the two secondary windings of transformer 16 manifests the same dependence upon the voltage of the A. C. source connectible to the primary winding 14.

The preceding discussion has considered the situation obtaining during steady state conditions. The present invention includes circuitry by which to maintain the D. C. output voltages constant even during transient conditions. Resistor 85 and capacitor 87 constitute a time constant circuit across the input rectified circuit fed by leads 76 and 78, and potentiometer 86 is connected across the capacitor 87. Thus the voltage across the potentiometer 86 is at all times equal to that across the capacitor 87, and the voltage in the lower portion of potentiometer 86, below contact arm 89, is obviously a proportional part of the voltage across capacitor 87. It will also be noted that capacitor 92, resistor 93 and the lower portion of potentiometer 86, are in series across the input rectified circuit, and these circuit elements themselves constitute a time constant circuit.

The values of the several circuit elements are so chosen that the time constant of the circuit including capacitor 92 is of the same order of magnitude as the time constant of the principal input filter circuit comprising resistor 32 and capacitor 36. The time constant of the circuit including capacitor 87, whose capacity is large relative to that of capacitor 92, is of a substantially greater value, in order to compensate for the thermal lag in changes of temperature of cathode 54 resulting from changes in temperature of the heater filament 57. Moreover, it is to be especially noted that the lower portion of potentiometer 86, so far as affects the potential impressed upon control grid 56, constitutes a resistive element which is a part of the two time constant circuits. Thus the lower portion of potentiometer 86 is responsive to changes of voltage across capacitor 87, being in parallel therewith, and at the same time is in series with the time constant circuit including capacitor 92. As a result of transient currents flowing in the lower portion of potentiometer 86 due to both of these effects, the voltage developed across this lower portion is sufficient, when combined with the stable voltage at point 95 and the resultant applied to the control grid 56, to virtually exactly compensate changes in output of thermionic tube 50 otherwise resulting from the transient effects of changes of plate voltage and heater filament current resulting from fluctuations in input A. C. voltage.

The capacitor 94, of small value, and resistor 90 constitute a time constant circuit across the lower portion of potentiometer 86. The effect of transient current in resistor 90 and the lower-portion of potentiometer 86 is to develop transient compensating voltages opposing changes in direct current flow in potentiometer 86, by which more accurately, if necessary, to maintain the correct compensating potential on control grid 56. The choice of whether to use capacitor 94 at all, and its value if used, will be determined by the tube constants of the particular thermionic tube 50 used. In view of manufacturing variations in electron tubes, a certain amount of empirical calibration of the circuit is necessary, both as to value of capacitor 94 and its resistor 90 as well as with respect to values of others of the circuit elements in the present invention, in order best to compensate the output voltage for each individual tube 50, as will be well understood by those skilled in the art.

As illustrative only of typical values of circuit elements which I have used in practicing the invention, the following data are presented for a 60 cycle, 115 volt input source, the output D. C. voltages being minus 35 volts at terminal 34 and plus 22.5 volts at terminal 65 and plus 82.5 volts at terminal 63. The circuit exhibits less than 0.01% variation in output voltage at terminal 63 when the input A. C. voltage varies from 100 volts to 130 volts. It may be noted that regulation of the voltage of terminal 34 is less accurate than that of terminals 63 and 65.

| | |
|---|---|
| Secondary 18 | 250 volts. |
| Secondary 20 | 6.3 volts. |
| Resistor 32 | 500 ohms, 5 watts. |
| Resistor 26 | 6000 ohms, 10 watts. |
| Resistor 68 | 12,000 ohms, 1 watt. |
| Resistor 66 | 30,000 ohms, 1 watt. |
| Resistor 64 | 80,000 ohms, 1 watt. |
| Resistor 46 | 15,000 ohms, 1 watt. |
| Resistor 85 | 5,000 ohms, ½ watt. |
| Resistor 93 | 5,000 ohms, ½ watt. |
| Resistor 90 | 10,000 ohms, ½ watt. |
| Potentiometer 86 | 100,000 ohms. |
| Capacitor 36 | 40 mfd., 450 volts. |
| Capacitor 70 | 50 mfd., 250 volts. |
| Capacitor 87 | 50 mfd., 12 volts. |
| Capacitor 92 | 5 mfd., 50 volts. |
| Capacitor 94 | 1 mfd., 200 volts. |

It will be readily understood that variations and changes from the above specific exemplary values, as well as from the details of circuitry herein shown and described, will occur to those skilled in the art, and are intended to be embraced within the scope of the appended claims.

I claim:

1. In a regulated D. C. power supply: an A. C. source; rectifying, filtering and regulating means fed from said source for producing a partially regulated D. C. voltage; a thermionic device including an anode, a control grid, a cathode and electrically energizable means, fed from said source, for heating the cathode; an output resistor connected to the cathode, said voltage being impressed across the thermionic device and resistor; a source of stable D. C. voltage; means for producing a small D. C. input voltage varying with the voltage of said A. C. source; a capacitor and series-connected resistor across said input voltage; a resistive element across said capacitor; a second capacitor and series-connected resistor connected in series with a selectively adjustable portion of said resistive element across said input voltage; and means for combining in polarity opposition said stable voltage and the voltage across said selectively adjustable portion of the resistive element and for impressing the resultant voltage on said control grid.

2. The invention as stated in claim 1 including a third capacitor and series-connected resistor connected across said selectively adjustable portion of the resistive element.

3. In a regulated D. C. power supply: an A. C. source; rectifying, filtering and regulating means connected to said source for producing a partially regulated D. C. voltage; a thermionic device including an anode, a control grid, a cathode and electrically energizable means, fed from said source, for heating the cathode; an output resistor connected to the cathode, said voltage being impressed across the thermionic device and resistor; a source of stable D. C. voltage; means for producing a small D. C. input voltage varying with the voltage of said A. C. source; a resistive element across said input voltage; a capacitor and series-connected resistor connected in series with a selectively adjustable portion of said resistive element across said input voltage; and means for combining, in polarity opposition, said stable voltage and the voltage across said portion and for impressing the resultant voltage on said control grid.

4. The invention as stated in claim 3 including a second capacitor and series-connected resistor connected across said portion.

5. A rectifying circuit for producing a D. C. power output from an A. C. source comprising: a transformer having a primary winding connected to an A. C. power source and high and low voltage secondary windings; rectifying and filtering means connected to said high voltage secondary winding for producing a raw D. C. voltage; a resistor and regulator tube fed by said raw D. C. voltage; a thermionic device having plate, cathode and control grid electrodes and means, fed from said low voltage winding, for heating the cathode; an output resistor connected to said cathode; means for impressing the voltage of said regulator tube across said thermionic device and output resistor; a voltage reference tube and resistor across the regulator tube; means for producing a D. C. voltage component varying in magnitude with the voltage of the A. C. source, said component being small relative to the voltage of said reference tube; means for combining the reference tube voltage and a selected portion of said varying voltage component in polarity opposition to form a control voltage; and means for impressing said control voltage on said control grid.

6. The invention as stated in claim 5 including time delay means for causing said varying D. C. voltage component to lag fluctuations in input A. C. voltage.

7. In a D. C. power supply: a cource of A. C. power; means for rectifying and filtering power from the source to produce a rectified voltage; regulator means fed by the rectified voltage for producing a partially regulated D. C. voltage; a grid-controlled thermionic tube having a cathode, control grid, anode and electrically energizable means fed from said source for heating said cathode; an output resistor connected to the tube; means for impressing said partially regulated voltage across said thermionic tube and output resistor; a source of virtually constant D. C. voltage component; means for producing a D. C. voltage component varying with fluctuations in voltage of said A. C. source including means for producing a small D. C. input voltage varying with the voltage of said A. C. source, a capacitor and series-connected resistor across said input voltage, a resistive element across said capacitor, and means for selecting a desired portion of the voltage drop across said element to constitute said varying D. C. voltage component; and means for combining said voltage components in polarity opposition to form a control voltage and for impressing the control voltage on the control grid.

8. A D. C. power supply comprising: an A. C. source; rectifying, filtering and regulating means connected to said source for producing a partially regulated D. C. voltage; a thermionic device including cathode, anode, control grid and electrically energized means fed from said A. C. source for heating the cathode; an output resistor connected to the thermionic device; means for impressing said partially regulated voltage across said device and resistor; a source of stable D. C. voltage; means for producing a D. C. voltage varying in accordance with voltage fluctuations of said A. C. source including a resistive element carrying current proportional, under steady state conditions, to said varying D. C. voltage and a capacitor, said capacitor and resistive element being connected in series and being part of a time constant circuit; and means for combining said stable D. C. voltage and said varying D. C. voltage and impressing the resultant voltage upon said control grid.

9. The invention as stated in claim 8 wherein said means for producing a varying D. C. voltage also includes a second capacitor and a series-connected resistor, said resistive element being in parallel with the second capacitor.

10. A D. C. power supply comprising: an A. C. source; rectifying, filtering and regulating means connected to said source for producing a partially regulated D. C. voltage; a thermionic device including cathode, anode, control grid and electrically energized means fed from said A. C. source for heating the cathode; an output resistor connected to the thermionic device; means for impressing said partially regulated voltage across said device and resistor; a source of stable D. C. voltage; means for producing a D. C. voltage varying in accordance with voltage fluctuations of said A. C. source including second rectifier means connected to said A. C. source for producing a D. C. input voltage, a capacitor and series-connected resistor across the D. C. input voltage and a resistive element across the capacitor; and means for combining said stable D. C. voltage and said varying D. C. voltage and impressing the resultant voltage upon said control grid.

References Cited in the file of this patent

UNITED STATES PATENTS

| | | |
|---|---|---|
| 2,431,994 | Dibrell et al. | Dec. 2, 1947 |
| 2,443,534 | Eglin | June 15, 1948 |
| 2,554,977 | Chapin | May 29, 1951 |
| 2,568,172 | Spencer | Sept. 18, 1951 |
| 2,573,744 | Trucksess | Nov. 6, 1951 |
| 2,593,066 | Singer | Apr. 15, 1952 |
| 2,632,143 | Goodwin | Mar. 17, 1953 |
| 2,698,414 | Meszaros | Dec. 28, 1954 |